United States Patent [19]

Rudd

[11] 4,136,272
[45] Jan. 23, 1979

[54] METHOD OF MANUFACTURING HEAT EXCHANGE PANELS

[75] Inventor: Wallace C. Rudd, New Canaan, Conn.

[73] Assignee: Thermatool Corporation, Stamford, Conn.

[21] Appl. No.: 790,335

[22] Filed: Apr. 25, 1977

[51] Int. Cl.² .................................... B23K 11/02
[52] U.S. Cl. .................... 219/107; 29/157.3 A; 29/157.3 C; 126/271; 219/102; 219/117.1
[58] Field of Search ............ 219/107, 102, 117.1; 126/271; 29/157.3 A, 157.3 C, 157.4

[56] References Cited

U.S. PATENT DOCUMENTS

| 2,809,276 | 10/1957 | Smith | 219/107 |
| 3,047,712 | 7/1962 | Morris | 219/107 |
| 3,319,040 | 5/1967 | Ruda | 219/107 X |
| 3,327,088 | 6/1967 | Rudd | 219/107 X |
| 3,375,344 | 3/1968 | Kohler | 219/107 |
| 3,541,296 | 11/1970 | Rudd | 219/107 X |

Primary Examiner—Richard R. Kucia

[57] ABSTRACT

Method for manufacturing heat exchange panels each comprising a plurality of sub-panels of finite length, each sub-panel comprising a metal tube welded to a metal sheet except at the end portions thereof which are secured to headers in fluid-tight relation thereto, in which method tubing and metal sheet having a length several times the length of the sub-panel are continuously advanced and welded together by high frequency electric current which is interrupted periodically so that a unit several times the length of a sub-panel and having tubing welded to the sheet by a weld which is continuous except at portions of the tubing spaced apart longitudinally by a distance substantially equal to the length of a sub-panel. The unit is cut at the unwelded portions to provide several sub-panels which are assembled to form the heat exchange panels. The metal sheet may be bent during manufacture of the unit to provide sub-panels having stiffening ribs or having projections for interlocking adjacent sub-panels.

10 Claims, 11 Drawing Figures

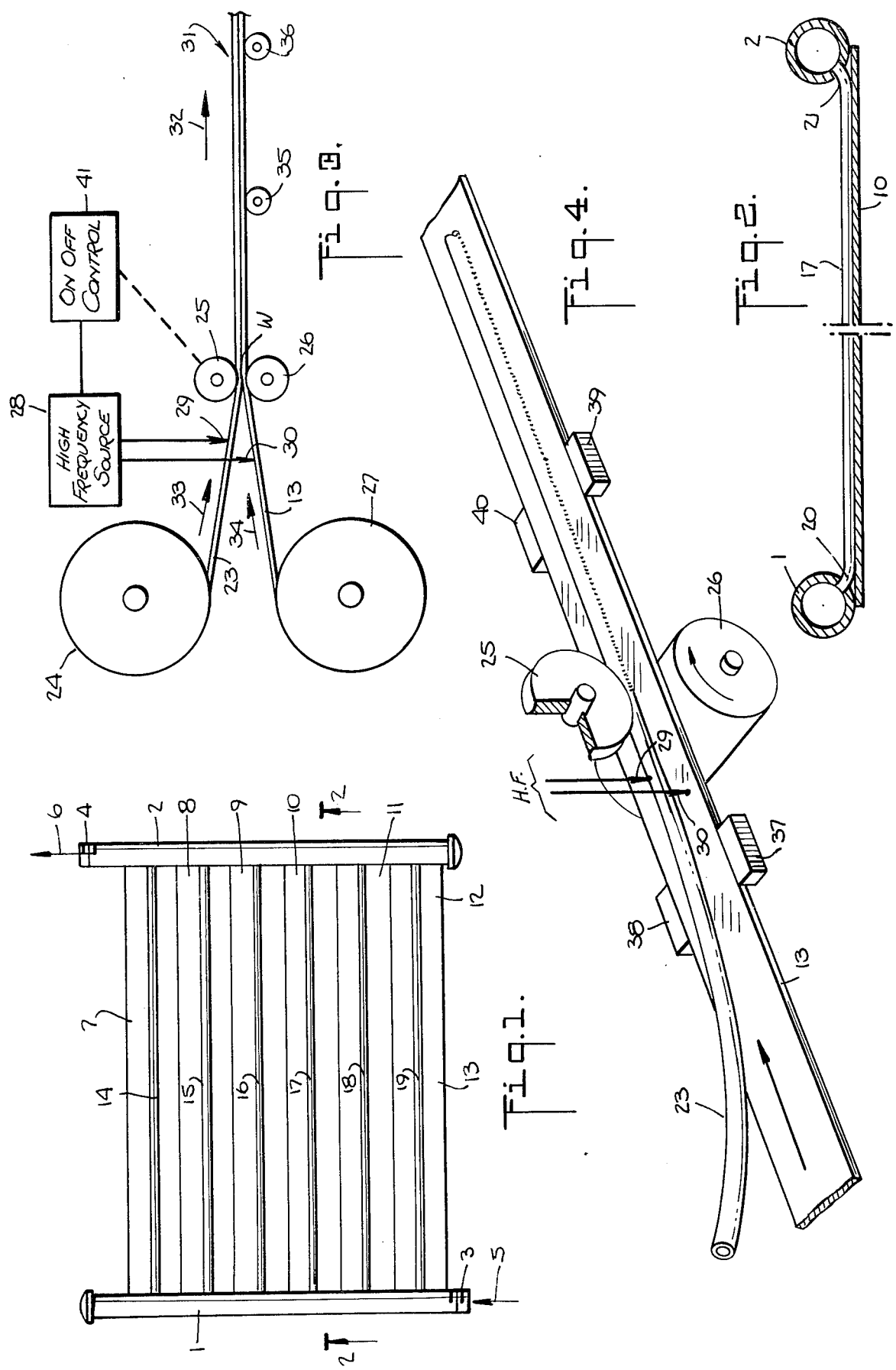

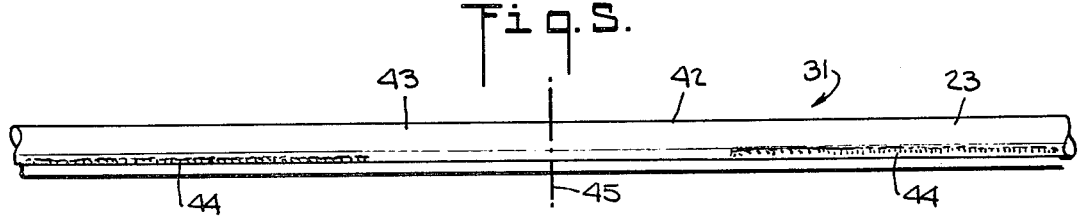
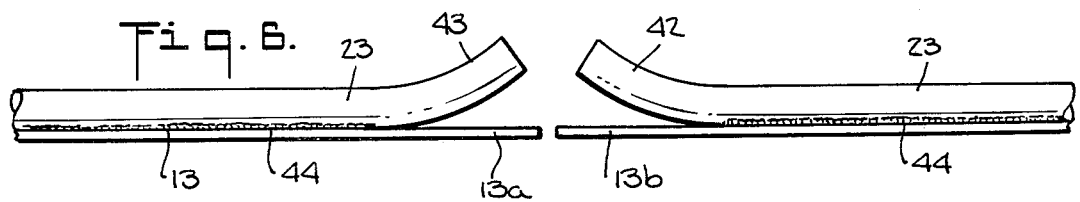
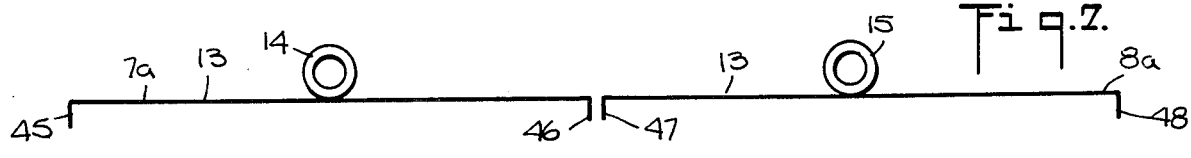
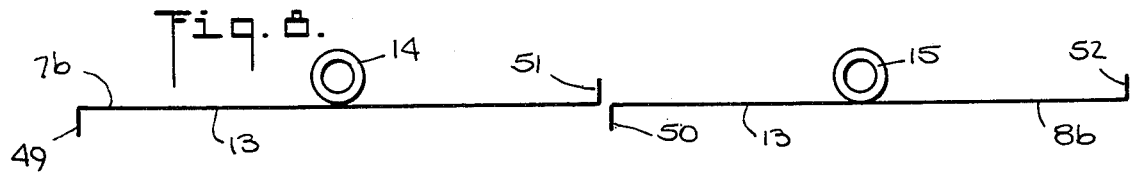
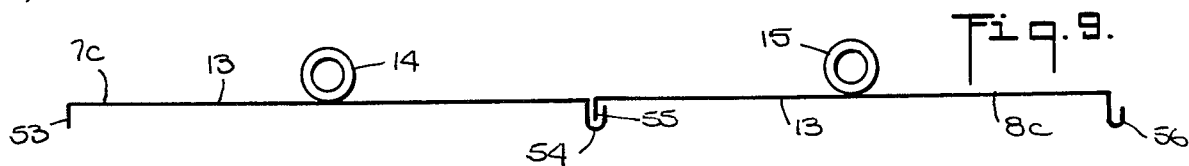
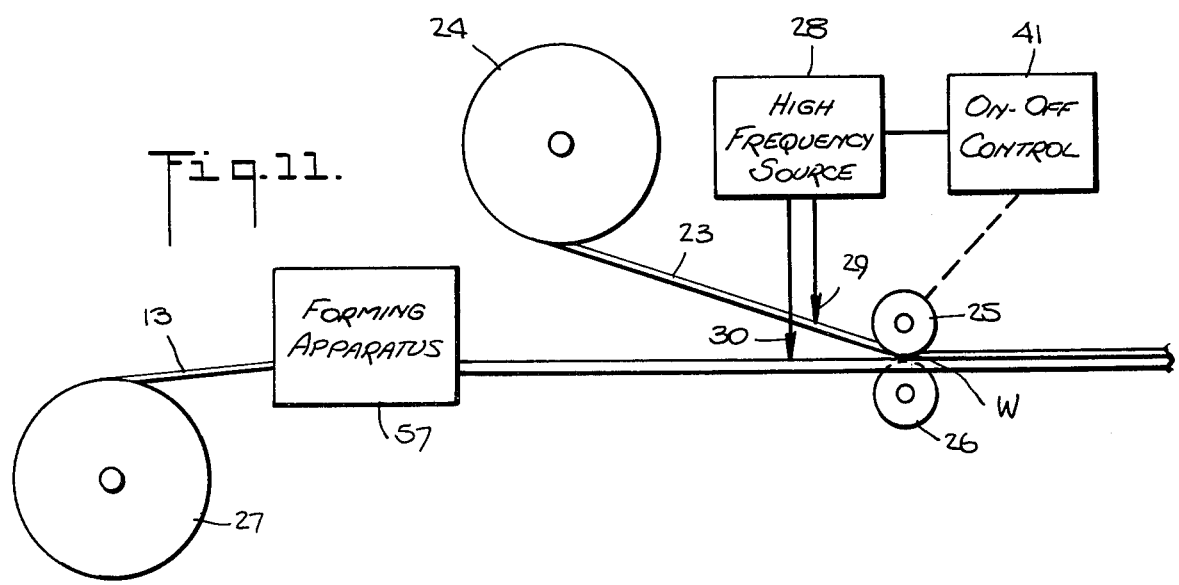

METHOD OF MANUFACTURING HEAT EXCHANGE PANELS

This invention relates to the manufacture of heat exchange panels of the type sometimes known as solar panels, which comprise heat absorbing metal sheets having tubing for conveying fluid secured to the sheets in good heat conducting relation thereto.

Interest in collecting energy from the sun for heating and other purposes has increased in recent years. In some systems, panels of heat absorbing metal sheets having fluid containing tubing secured to the sheets in good heat conducting relation thereto are used. The tubing may be made of aluminum, copper, coated steel, etc., and the sheets may be made of the same or different metals. The sheets are the principal heat collecting elements and have a relatively large area, and the tubing acts as a fluid conduit for a fluid, such as water, which absorbs heat from the tubing and which is pumped to a point, usually remote from the panels, where the heat is extracted from the fluid.

In a given installation, there may be one large panel or several smaller panels, the length of a panel, in the length direction of the tubing, often being of the order of six to ten feet. A panel may have several lengths of spaced apart lengths of tubing. In some cases, the tubing on a panel may be continuous and extend along a serpentine path, and in other cases, individual lengths of tubing, parallel to each other, may be mounted on the underlying sheet. In either case, the ends of the tubing usually are secured to a pair of headers, either mechanically or by soldering or brazing, which supply the fluid to, and remove the fluid from, the tubing.

In order to be efficient in the transfer of heat from the sheet to the tubing and then to the fluid, there should be a good heat transfer connection between the tubing and the sheet. Generally, this is difficult to obtain with mere mechanical contact between the tubing and the sheet, and resort is had to soldering, brazing or welding of the tubing to the sheet to obtain the desired heat transfer. The prior art methods of accomplishing the soldering, brazing or welding which have been used to make solar panels are relatively time consuming and expensive. Accordingly, a significant part of the cost of a solar panel installation is the cost of making the panels.

High frequency electrical welding of tubing to metal sheet by means of the apparatus and methods disclosed in U.S. Pat. Nos. 2,821,619 and 3,319,040 is known in the art. In accordance with such methods, the sheet and tubing are continuously advanced to and past a weld point with the sheet and tubing slightly spaced in advance of the weld point and are forge welded together at the weld point. A short distance in advance of the weld point, high frequency electric current, e.g., of 50 kilohertz or higher, is supplied to the tubing and the sheet by means of contacts, such current heating the facing surfaces of the sheet and tubing to welding temperature by the time they reach the weld point. With such methods, tubing can be welded to sheet at speeds of 300 feet per minute or higher. However, as far as I am aware, such welding methods have not been used heretofore for the manufacture of panels of the type described hereinbefore.

One object of the invention is to provide methods of making heat exchange panels useful as solar panels which permit the making thereof at relatively high speeds and relatively inexpensively as compared to methods previously used.

In accordance with the preferred embodiment of the method of the invention for making a heat exchange panel, the panel is made up of several side-by-side, sub-panels each comprising a finite length of tubing welded to metal sheet, the tubing having free ends which are joined to headers. Each length, which may be of the order of 4 to 15 feet in length, is made by continuously feeding tubing and metal sheet or ribbon from coils of such tubing and metal sheet to a weld point at which they are welded together, high frequency electric current being supplied to the tubing and metal sheet shortly in advance of the weld point by way of contacts to heat the facing surfaces of the tubing and metal sheet to forge welding temperature by the time they reach the weld point. The linear lengths of the tubing and the metal sheet are many times, i.e., at least ten times, the length of the welded tubing-metal sheet combination desired for forming a sub-panel, and the supply of high frequency current is turned on and off during the welding by a known type of measuring and control device, so that no weld is produced between the tubing and the metal sheet at intervals corresponding to the desired length of the tubing-metal sheet combination and for a distance sufficient to provide the desired tubing free end portions. During the continuous advance of the tubing and metal sheet, or thereafter, the tubing and the metal sheet are severed at the unwelded portions thereof to provide many lengths, i.e., at least ten lengths, in a single welding run, of the tubing-metal sheet combination, each having tubing with free end portions at each end of a length but otherwise being welded to the metal sheet. If desired, the portions of the metal sheet which are not welded to the tubing may be removed. The free end portions of the tubing are then secured in fluid-tight relation to headers, e.g., by soldering, brazing or mechanical means, to provide a plurality of sub-panels in side-by-side relation and joined to headers at opposite ends thereof.

In a further embodiment of the invention, the metal sheet is formed with ribs, upturned or downturned edges or locking edges as it is advanced toward the weld point so as to stiffen the resulting lengths of tubing-metal sheet combination or sub-panels and, if desired, to permit mechanical interlocking of the sub-panels at their sides.

Other objects and advantages of the present invention will be apparent to those skilled in the art from the following detailed description of presently preferred embodiments, which description should be considered in conjunction with the accompanying drawings in which:

FIG. 1 is a diagrammatic, plan view of a heat exchange panel constructed in accordance with the invention;

FIG. 2 is a cross-sectional, end view of the embodiment shown in FIG. 1 and is taken along the line 2—2 indicated in FIG. 1;

FIG. 3 is a diagrammatic, side elevation view of apparatus for the manufacture of a unit from which sub-panels for the panel shown in FIG. 1 are formed;

FIG. 4 is an enlarged, perspective view of a portion of the apparatus shown in FIG. 3;

FIG. 5 is an enlarged, side elevation view of a portion of the unit manufactured as indicated in FIGS. 3 and 4;

FIG. 6 is an enlarged, side elevation view of the embodiment shown in FIG. 5 after the tube and the metal sheet to which it is welded have been severed;

FIGS. 7, 8, 9 and 10 are diagrammatic, end views illustrating various modifications of the metal sheet to which tubing is welded in accordance with the invention; and FIG. 11 is a diagrammatic, side elevation view of a modified form of the apparatus shown in FIG. 3 employed for producing the metal shapes illustrated in FIGS. 7–10.

With reference to FIGS. 1 and 2, a panel of the type with which the invention is concerned, comprises a pair of headers 1 and 2 having threaded ends 3 and 4 to which a fluid supply, such as a water supply, is connected for supplying the fluid to the header 1 as indicated by the arrow 5 and removing the fluid from the header 2 as indicated by the arrow 6. Intermediate the headers 1 and 2 are a plurality of sub-panels 7–12, each of which comprises metal sheet material 13 having secured thereto by welding a plurality of tubes 14–19. Each of the free end portions of the tubes 14–19 is secured at its opposite end in fluid-tight relation to the headers 1 and 2 by any well-known means, such as by soldering or brazing, or by a mechanical fitting. Each of the panels 7–12 and the tubes 14–19 may be colored, such as by painting with black paint, so as to increase the heat absorbing ability of the sub-panels 7–12.

Each tube 14–19 is of finite length, e.g., having a length of from about four to fifteen feet, and the free end portions 20 and 21 of the tube 17 are shown in FIG. 2. Such free end portions 20 and 21 are relatively short as compared to the lengths of the tubes 14–19 and may, for example, be from about two to six inches in length. As described hereinafter, such portions 20 and 21 are not welded to the metal sheet material 13 during the welding of the remainder of the tube 17 to the metal sheet material in order to provide tube ends suitable for connection to the headers 1 and 2. The portions 20 and 21, and the corresponding portions of the other tubes 14–16 and 18 and 19 preferably are as short as possible, consistent with the requirement of ease of assembly with the headers 1 and 2, in order to have the maximum amount of good heat conductive connection between the tubes 14–19 and the metal sheet material 13. It will be noted that to attempt to provide the portions 20 and 21 by first welding the entire length of the tube 17 to the material 13 and then separating the portions 20 and 21 from the material 13 would be impractical, not only from the standpoint of the labor required, but also from the standpoint of difficulty in separating the portions 20 and 21 from the material without damage or distortion to the portions. It is, of course, desirable to have relatively smooth and undistorted end portions 20 and 21 for ease in providing a fluidtight connection with the headers 1 and 2.

For providing a long life in use and for providing good heat transfer, the tubes 14–19 usually are made of copper or aluminum, but they may be made of other metals, such as, coated, aluminized or galvanized steel. The sheet material 13 is made of similar metals and may be made of the same metal as the tubes 14–19 or a different metal.

In the preferred embodiment of the method of the invention illustrated in connection with FIGS. 3 and 4, tubing 23, e.g., copper or aluminum tubing, is supplied from a coil 24 thereof to a weld point W between a pair of rollers 25 and 26, the roller 25 having a peripheral groove for receiving the tubing 23 and the roller 26 having a flat surface for engaging metal sheet or strip material 13 supplied from a coil 27 thereof. Typically, the tubing 23 may have an outside diameter from one-quarter to one-half inch and a wall thickness from 0.012 to 0.062 inches, and the metal sheet material 13 may have a width from four to eight inches and a thickness from 0.010 to 0.062 inches, both the tubing 23 and the material 13 preferably having a flexibility which permits them to be wound in coils. Typically, also, the linear length of the tubing 23 and the material 13 is several hundred feet, coils of 1200 feet of tubing 23 and material 13 being commercially available. In any event, in order to obtain all the advantages of the invention, the linear length of the tubing 23 and the material 13 should be at least ten times the length of a sub-panel 7–12, and hence, the length of a tube 14–19, whenever panels of the type to which the invention relates are to be manufactured.

The tubing 23 and the sheet material 13 are fed continuously to the weld point W where they contact and are pressed together by the rollers 25 and 26 to form a weld therebetween as long as high frequency current is supplied thereto from the source 28 by means of the diagrammatically illustrated contacts 29 and 30, the contact 29 engaging the tubing 23 and the contact 30 engaging the sheet material 13. The tubing 23, the sheet material 13 and the unit 31 comprising the tubing 23 welded to the sheet material 13, move continuously, during the welding, in the direction of the arrows 32–34 and are so moved by any conventional means. Thus, as long as the high frequency current is supplied to the tubing 23 and the material 13, the facing surfaces of the tubing and the material 13 heat up to welding temperature, preferably, forge welding temperature, by the time that they reach the weld point W. The width of the area of the surface of the material 13 which is heated to the welding temperature is approximately equal to the wall thickness of the tubing 23 but may be as much as two wall thicknesses. During the cooling of the weld metal, the unit 31 is supported by the rollers 35 and 36, and the material 13 may be guided laterally by guides 37–40.

When the welding current is discontinued, welding of the tubing 23 to the material 13 continues for a short time, and then, the temperature of subsequent portions of the tubing 23 and the material 13 becomes too low for the production of a weld therebetween. For a short time after the supply of welding current is resumed and depending upon the speed of advance of the tubing 23 and the material 13, as well as the magnitude of the welding current, welding of the tubing 23 to the material 13 does not take place. In the method of the invention, the welding current is turned on and off, as the tubing 23 and the material 13 are advanced, for a time such that the length of a tube, such as a tube 14–19, minus the desired length of the free end portions, such as the portions 20 and 21, is welded to the sheet material 13, thereby to produce a continuous unit 31 comprising several interconnected sub-panels 7–12.

The welding current is turned on and off by a control unit 41 operable by any means which is operable in accordance with the movement of the unit 31. The control unit 41 may, for example, be the cam and switch unit connected to the oscillator of the source 28 as described in U.S. Pat. No. 3,319,040. The cam is selected so as to provide the desired interval of welding current interruption and is driven in synchronism with a device, such as the pressure roller 25 or any other means for measuring the length of the unit 31 which has passed the weld point W, and at a rate such that all but portions of the tubing 23 corresponding to the free end portions 20 and 21 are welded to the material 13 by a continuous weld.

During the making of the unit 31, the unit 31 may be cut into sub-panels as they are formed, e.g., by a flying saw, or a unit 31 comprising several interconnected sub-panels may be made, and thereafter, the desired number of sub-panels may be cut from the unit 31.

FIG. 5 illustrates, in enlarged form, a portion of the unit 31 formed at and adjacent to the time when welding current is interrupted. In FIG. 5, the tubing 23 has portions 42 and 43, corresponding to the portions 20 and 21, which are not welded to the sheet material 13 and on each side of the portions 42 and 43 there is a longitudinally continuous weld 44 between the tubing 23 and the material 13. The length of each weld 44 is substantially equal to, but less than, the length of a tube 14–19. For example, if a sub-panel 7–12 six feet long and end portions 42 and 43, each three inches long, are desired, the length of a weld 44 would be about five feet and six inches.

The unit 31 is cut along the line 45 for each sub-panel length, the line 45 being selected so that the portions 42 and 43 are of approximately equal length. Thereafter, the portions 42 and 43 may be bent away from the sheet material 13 (as shown in FIG. 6) if the connection of the sub-panels 7–12 to the headers 1 and 2 is as shown in FIG. 2. If desired, the portions 13a and 13b may also be removed or bent downwardly. However, if desired, the portions 42 and 43 may be left unbent, and the portions 13a and 13b of the sheet material 13 therebelow may be cut away or bent downwardly to permit the portions 42 and 43 to be secured to the headers 1 and 2.

When the sub-panels 7–12 have been made, as described hereinbefore, they are assembled with the headers 1 and 2 in an obvious manner and in side-by-side relation as shown in FIG. 1, the free end portions of the tubes 14–19 being inserted into openings in the headers 1 and 2 and being secured in fluid-tight relation to the headers 1 and 2 in a conventional manner, such as by mechanical fittings, brazing or soldering.

In some cases, such as when the tubing 23 is thin-walled and flexible and/or the sheet material 13 is relatively thin and flexible or when the length of the sub-panels 7–12 is relatively great, it may be desirable to increase the rigidity of the sub-panels 7–12 by stiffening ribs or projections. It may also be desirable to mechanically interlock the sub-panels. FIGS. 7–10 illustrate in cross-section typical shapes of the sheet material 13 which will provide stiffening and, in the case of FIG. 9, mechanical interlocking of the sub-panels. Each of the shapes illustrated in FIGS. 7–10 may be produced easily using well-known types of forming apparatus.

FIG. 7 illustrates sub-panels 7a and 8a, each having downwardly bent edge portions 45–48 which extend longitudinally of the sub-panels 7a and 8a, and hence, in the direction of advance of the sub-panels 7a and 8a as they are made, and which extend transversely to the plane of the surface of the metal sheet material 13 which is welded to the tubes. FIG. 8 is similar to FIG. 7 except that each sub-panel 7b and 8b has one downwardly bent edge portion 49 and 50 and one upwardly bent edge portion 51 and 52.

FIG. 9 illustrates sub-panels 7c and 8c having interlocking edge portions 53–56. Thus, each downwardly bent portion 53, 55 is receivable in the U-shaped portion 54, 56 of the next adjacent sub-panel, portion 55 of the panel 8c being receivable in the U-shaped portion 54 of the panel 7c, for example. When the sub-panel 8c is disposed as shown in FIG. 9, the portion 54 may be crimped to mechanically lock it to the portion 55.

FIG. 10 illustrates panels 7d and 8d having the sheet material 13 bent upwardly and downwardly to provide a corrugated cross-section, the tubes 14 and 15 being welded to the top of the central corrugations.

FIG. 11 illustrates the preferred modifications of the apparatus shown in FIG. 3 for producing the sub-panels shown in FIGS. 7–10. Although it is possible to bend the sheet material 13 subsequent to the time that the tubing 23 is welded thereto at the weld point W, it is preferred to bend and form the sheet material 13 prior to its arrival at the weld point W by means of conventional forming apparatus 57 disposed upstream of the weld point W. The method of forming sub-panels with the apparatus shown in FIG. 11 is the same as the method described in connection with FIGS. 3–6 except for the bending of the sheet material 13 by the forming apparatus 57.

Although preferred embodiments of the present invention have been illustrated and described, it will be apparent to those skilled in the art that various modifications may be made without departing from the principles of the invention.

What is claimed is:

1. A method for making a heat exchange panel comprising a plurality of sub-panels each comprising a finite length of a metal tube secured by welding to metal sheet material except at opposite end portions thereof which are small relative to said finite length, said method comprising continuously advancing both metal tubing and a metal sheet in separated relation to a weld point, said sheet having a face which is narrow relative to its length and which is wider than the thickness of said sheet, pressing said tubing and said face of said metal sheet together at said weld point and continuously removing said tubing and said metal sheet from said weld point, said tubing and said metal sheet having corresponding longitudinally continuous lengths at least several times said finite length of said tubing, supplying high frequency current to said tubing and said metal sheet upstream of said weld point to cause the facing surfaces thereof to reach welding temperature by the time that they reach the weld point thereby forming a longitudinally continuous weld between said tubing and said metal sheet during the time that said high frequency current is supplied to said tubing and said metal sheet, interrupting the supply of high frequency current to said tubing and said metal sheet each time that a length of said tubing substantially equal to but less than said finite length passes said weld point so that a portion of said tubing which is small in length relative to said finite length is not welded to said metal sheet, whereby there is provided a unit of a length several times said finite length and which comprises said tubing welded to said metal sheet along most of the length of the tubing but with weld interruptions spaced apart a distance substantially equal to said finite length, severing said unit at each weld interruption and intermediate the ends of said portion of said tubing to provide several of said sub-panels each having tubing thereon of said finite length welded to said metal sheet except at the end portions of said last-mentioned tubing, and assembling a plurality of said sub-panels in side-by-side relation to form said heat exchange panel.

2. A method as set forth in claim 1 further comprising separating said end portions and the associated sub-panels after severing said unit.

3. A method as set forth in claim 2, wherein said end portions are separated from the sub-panel by bending said end portions away from the associated sub-panel.

4. A method as set forth in claim 3 further comprising removing the portions of said sub-panels underlying said end portions of said tubing.

5. A method as set forth in claim 2, wherein said end portions and said sub-panels are separated by bending the portions of said sub-panels underlying said end portions of said tubing away from said last-mentioned portions.

6. A method as set forth in claim 2, wherein said end portions and said sub-panels are separated by removing the portions of said sub-panels underlying said end portions of said tubing.

7. A method as set forth in claim 1 further comprising securing the end portions of the tubing of a plurality of said sub-panels to a pair of headers with said sub-panels in side-by-side relation and with one of said headers at one end of each sub-panel and the other of said headers at the other end of each sub-panel.

8. A method as set forth in claim 1 further comprising bending said metal sheet in a direction transverse to the plane of the surface thereof which is welded to said tubing as the metal sheet is advanced to provide at least one deflected portion of said metal sheet extending in the direction of advance.

9. A method as set forth in claim 8, wherein said bending is performed at the edges of said metal sheet which are parallel to the direction of advance to provide edge portions extending transversely to said plane.

10. A method as set forth in claim 8, wherein said metal sheet is bent at one of its edges into a shape which is U-shaped in cross-section and the other of its edges is bent into a shape receivable in the U-shaped edge of an adjacent sub-panel and further comprising assembling a plurality of said sub-panels in side-by-side relation with said other edge of one sub-panel received within said U-shaped one edge of the next adjacent panel and compressing said U-shaped edge to mechanically interlock said one sub-panel and said next adjacent sub-panel.

* * * * *